United States Patent [19]
Jelinek et al.

[11] Patent Number: 5,826,167
[45] Date of Patent: Oct. 20, 1998

[54] BI-DIRECTIONAL CABLE TELEVISION SYSTEM INCLUDING A UHF FILTER

[75] Inventors: Catherine W. Jelinek, Lawrenceville; Herman A. Kruse, Winder; Munther A. Al-Khalil, Norcross; Leo J. Thompson, Lilburn, all of Ga.

[73] Assignee: Scientific-Atlanta, Inc., Norcross, Ga.

[21] Appl. No.: 838,333

[22] Filed: Apr. 8, 1997

Related U.S. Application Data

[63] Continuation of Ser. No. 304,171, Sep. 12, 1994, abandoned.

[51] Int. Cl.$^6$ .............................. H04H 1/00; H04N 7/14; H01P 5/12
[52] U.S. Cl. .......................... 455/5.1; 333/126; 333/134; 348/12; 348/17
[58] Field of Search .................................. 348/7, 10, 11, 348/12, 13, 6, 17, 16, 15, 14; 455/3.1, 5.1, 6.1, 4.1, 4.2, 6.2; 333/125, 126, 129, 132, 134, 136; H04N 7/10, 7/14, 7/173

[56] References Cited

U.S. PATENT DOCUMENTS

| | | |
|---|---|---|
| 3,289,271 | 12/1966 | Watson . |
| 3,806,813 | 4/1974 | Eller ......................................... 455/5.1 |
| 3,891,792 | 6/1975 | Kimura . |

(List continued on next page.)

FOREIGN PATENT DOCUMENTS

| | | |
|---|---|---|
| 2044574 | 12/1992 | Canada . |
| 187961 | 7/1986 | European Pat. Off. . |
| 243312 | 10/1987 | European Pat. Off. . |
| 355697 | 2/1990 | European Pat. Off. . |
| 402809 | 12/1990 | European Pat. Off. . |
| 420123 | 4/1991 | European Pat. Off. . |
| 424648 | 5/1991 | European Pat. Off. . |
| 425834 | 5/1991 | European Pat. Off. . |
| 506435 | 9/1992 | European Pat. Off. . |
| 513763 | 9/1992 | European Pat. Off. . |
| 3423846 | 1/1986 | Germany . |
| 3935294 | 4/1991 | Germany . |
| 61-060150 | 3/1986 | Japan . |
| 62-24777 | 2/1987 | Japan . |
| 1130683 | 5/1989 | Japan . |
| 1142918 | 6/1989 | Japan . |
| 3114375 | 5/1991 | Japan . |
| 3198119 | 8/1991 | Japan . |
| 5250106 | 9/1993 | Japan . |

(List continued on next page.)

OTHER PUBLICATIONS

"Two–Way Cable Plant Charateristics", Richard Citta and Dennis Mutzabaugh, Technical Papers, NCTA Jun. 3–6, 1984, pp. 270–277.
Market and Products Overview, Dinaro et al. 1991.
Subscriber Distribution Networks Using Compressed Digital Video, Olshansky et al., Nov., 1992.
Memories In My Pocket, Reimer, Feb. 1991.
Interactive Videotex . . . , van den Boom, Nov.–Dec. 1986.
Digital Compression in Todays . . . , Moloney, Jun. 6, 1993.
Flexible Data Structures . . . , Bestler, Jun. 6, 1993.
A Store–and–Forward . . . , Gelman et al., Jun. 21, 1991.
Subscription teletext for value added services, Sharpless, Aug. 1985.

*Primary Examiner*—John K. Peng
*Assistant Examiner*—John W. Miller
*Attorney, Agent, or Firm*—Kenneth M. Massaroni; John Victor Pezdek

[57] ABSTRACT

A cable television system employs two-way communication between a headend and at least one subscriber terminal. The two-way communication is provided by having separate frequency bands for each communication path. The frequency bands do not overlap and the higher frequency band is used for subscriber terminal to headend transmissions. A line amplifier is provided that employs two diplex filters each connected to both a forward and reverse amplifier. The high pass portions of the diplex filters are formed from both lumped and distributed components.

13 Claims, 5 Drawing Sheets

U.S. PATENT DOCUMENTS

| | | |
|---|---|---|
| 4,003,005 | 1/1977 | Mukherjee et al. .................... 333/129 |
| 4,247,347 | 1/1981 | Litteral et al. . |
| 4,361,848 | 11/1982 | Poignet et al. . |
| 4,484,217 | 11/1984 | Block et al. . |
| 4,488,179 | 12/1984 | Kruger et al. . |
| 4,605,964 | 8/1986 | Chard . |
| 4,639,225 | 1/1987 | Washizuka . |
| 4,688,218 | 8/1987 | Blineau et al. . |
| 4,688,246 | 8/1987 | Eilers et al. . |
| 4,706,121 | 11/1987 | Young . |
| 4,712,105 | 12/1987 | Kohler . |
| 4,724,491 | 2/1988 | Lambert . |
| 4,792,972 | 12/1988 | Cook, Jr. . |
| 4,826,901 | 5/1989 | Music et al. . |
| 4,829,558 | 5/1989 | Welsh . |
| 4,829,569 | 5/1989 | Seth-Smith et al. . |
| 4,860,379 | 8/1989 | Schoeneberger et al. . |
| 4,876,736 | 10/1989 | Kiewit . |
| 4,928,168 | 5/1990 | Iwashita . |
| 4,947,429 | 8/1990 | Bestler et al. . |
| 4,949,187 | 8/1990 | Cohen . |
| 4,959,810 | 9/1990 | Darbee et al. . |
| 4,961,109 | 10/1990 | Tanaka . |
| 4,966,597 | 10/1990 | Duffield . |
| 4,975,951 | 12/1990 | Bennett . |
| 4,977,455 | 12/1990 | Young . |
| 4,995,078 | 2/1991 | Monslow et al. . |
| 5,001,554 | 3/1991 | Johnson et al. . |
| 5,015,829 | 5/1991 | Eilert et al. . |
| 5,020,129 | 5/1991 | Martin et al. . |
| 5,027,400 | 6/1991 | Baji et al. . |
| 5,036,394 | 7/1991 | Morii et al. . |
| 5,036,537 | 7/1991 | Jeffers et al. . |
| 5,046,093 | 9/1991 | Wachob . |
| 5,047,867 | 9/1991 | Strubbe et al. . |
| 5,049,990 | 9/1991 | Kondo et al. . |
| 5,057,917 | 10/1991 | Shalkauser et al. . |
| 5,077,607 | 12/1991 | Johnson et al. . |
| 5,078,109 | 1/1992 | Aoki . |
| 5,091,782 | 2/1992 | Krause et al. . |
| 5,093,718 | 3/1992 | Hoarty et al. . |
| 5,105,268 | 4/1992 | Yamanouchi et al. . |
| 5,130,792 | 7/1992 | Tindell et al. . |
| 5,132,789 | 7/1992 | Ammon et al. . |
| 5,133,079 | 7/1992 | Ballantyne et al. . |
| 5,144,663 | 9/1992 | Kudelski . |
| 5,151,782 | 9/1992 | Ferraro . |
| 5,151,789 | 9/1992 | Young . |
| 5,152,011 | 9/1992 | Schwob . |
| 5,155,591 | 10/1992 | Wachob . |
| 5,166,886 | 11/1992 | Molnar et al. . |
| 5,172,413 | 12/1992 | Bradley et al. . |
| 5,182,639 | 1/1993 | Jutamulia . |
| 5,202,817 | 4/1993 | Koenck et al. . |
| 5,206,722 | 4/1993 | Kwan . |
| 5,206,954 | 4/1993 | Inoue et al. . |
| 5,216,515 | 6/1993 | Steele et al. . |
| 5,223,924 | 6/1993 | Strubbe . |
| 5,237,311 | 8/1993 | Mailey et al. . |
| 5,253,066 | 10/1993 | Vogel . |
| 5,253,275 | 10/1993 | Yurt et al. . |
| 5,260,778 | 11/1993 | Kauffman et al. . |
| 5,283,639 | 2/1994 | Esch et al. . |
| 5,293,141 | 3/1994 | Kobayashi et al. .................... 333/134 |
| 5,293,540 | 3/1994 | Trani et al. . |
| 5,323,240 | 6/1994 | Amano et al. . |
| 5,327,554 | 7/1994 | Palazzi, III et al. . |
| 5,341,166 | 8/1994 | Garr et al. . |
| 5,343,158 | 8/1994 | Gris et al. ................................ 455/5.1 |
| 5,343,239 | 8/1994 | Lappington et al. . |
| 5,345,594 | 9/1994 | Tsuda . |
| 5,353,121 | 10/1994 | Young et al. . |
| 5,355,162 | 10/1994 | Yazolinno et al. . |
| 5,357,276 | 10/1994 | Banker et al. . |
| 5,367,571 | 11/1994 | Bowen et al. . |
| 5,375,068 | 12/1994 | Palmer et al. . |
| 5,390,337 | 2/1995 | Jelinek et al. ........................... 455/5.1 |
| 5,404,393 | 4/1995 | Remillard . |
| 5,410,326 | 4/1995 | Goldstein . |
| 5,410,344 | 4/1995 | Graves et al. . |
| 5,414,426 | 5/1995 | O'Donnell et al. . |
| 5,416,508 | 5/1995 | Sakuma et al. . |
| 5,421,030 | 5/1995 | Baran ....................... 348/12 |
| 5,425,027 | 6/1995 | Baran ....................... 348/11 |
| 5,432,542 | 7/1995 | Thibadeau et al. . |

FOREIGN PATENT DOCUMENTS

| | | |
|---|---|---|
| 1204190 | 9/1970 | United Kingdom . |
| 2168227 | 6/1986 | United Kingdom . |
| 8601962 | 3/1986 | WIPO . |
| 8909528 | 10/1989 | WIPO . |
| 9010988 | 9/1990 | WIPO . |
| 9100670 | 1/1991 | WIPO . |
| 9103112 | 3/1991 | WIPO . |
| 9211713 | 7/1992 | WIPO . |
| 9212599 | 7/1992 | WIPO . |
| 9217027 | 10/1992 | WIPO . |
| 9221206 | 11/1992 | WIPO . |
| 9322877 | 11/1993 | WIPO . |

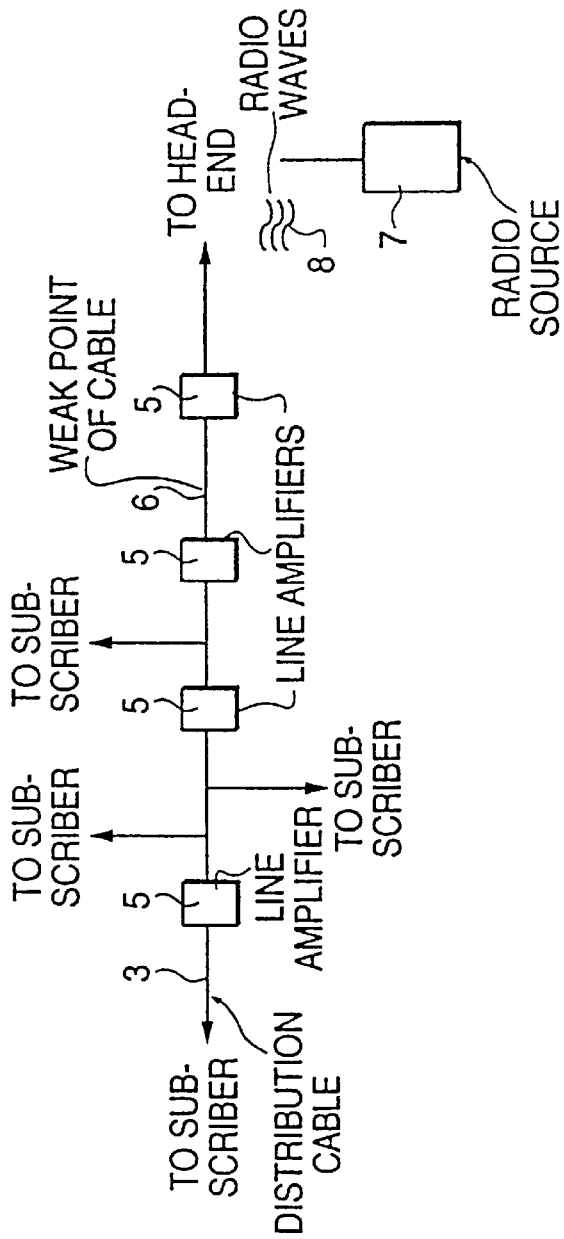
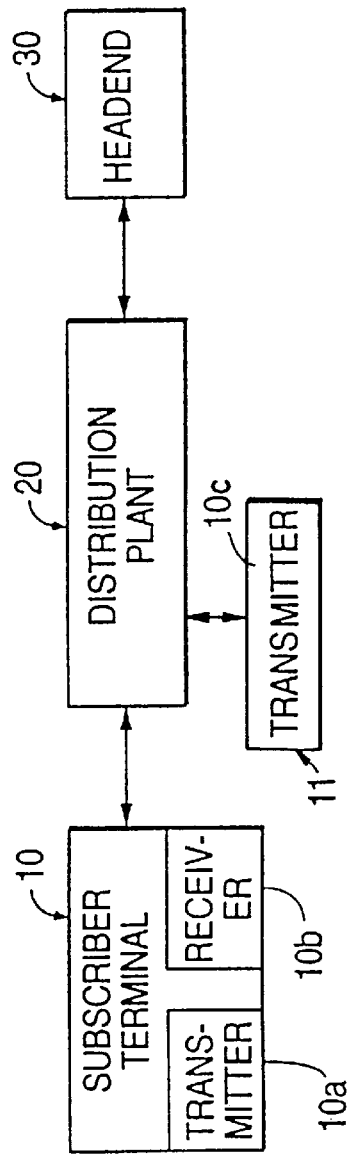

BI-DIRECTIONAL CABLE TELEVISION SYSTEM INCLUDING A UHF FILTER

This application is a continuation of application Ser. No. 08/304,171, filed Sep. 12, 1994, now abandoned.

BACKGROUND OF THE INVENTION

1. Technical Field

The present invention generally relates to a technique for bi-directionally transmitting data along a transmission path in a cable television system having a plurality of subscriber terminals.

2. Background of the Related Art

Cable television systems have always employed one-way communication from the cable service provider to the subscriber to provide television programming. The development of cable television systems has reached the stage where the provision of two way information flow is desirable and practically required for the implementation of new services. For example, in the implementation of impulse pay-per-view services where the subscriber may impulsively select an event for viewing and assume a charge, at least one data channel such as a telephone communication channel or an RF channel is required in an upstream (reverse) direction from a cable television subscriber to a cable television headend to report service usage data. Other uses for a return path include active device status monitoring, power meter reading, alarm services, subscriber polling and voting, collecting subscriber viewing statistics, home shopping and telephony. While not every cable television system operator provides for two way transmission, manufacturers of cable television equipment have tended to provide for upstream transmission in the direction from the subscriber toward the headend.

Practically all such manufacturers provide so-called split or two way systems having one spectrum of frequencies for forward transmissions (headend to subscriber) and another spectrum of frequencies for reverse transmissions (subscriber to headend). These systems have used the higher of the frequency bands for forward transmission and the lower of the frequency bands for reverse transmission. Forward transmissions, for example, have been provided in the 54–550 MHz band. Reverse transmissions have generally been provided on the 5 to 30 MHz band.

An article entitled "Two-Way Cable Plant Characteristics" by Richard Citta and Dennis Mutzbaugh published in the 1984 National Cable Television Association conference papers demonstrates the results of an examination of typical cable television return plants. Five major characteristics in the 5–30 MHz upstream band were analyzed. These include white noise and the funneling effect; ingress or unwanted external signals; common mode distortion resulting from defective distribution apparatus; impulse noise from power line interference and other influences; and amplifier non-linearities.

White noise and Gaussian noise are terms often used to describe random noise characteristics. White noise describes a uniform distribution of noise power versus frequency, i.e., a constant power spectral density in the band of interest, here, 5–30 megahertz. Components of random noise include thermal noise related to temperature, shot noise created by active devices, and 1/f or low frequency noise which decreases with increased frequency. The term noise floor is used to describe the constant power level of such white noise across the band of interest.

This noise is carried through each return distribution amplifier which adds its own noise and is bridged to the noise from all branches to a line to the headend. This addition of noise from each branch of the distribution tree in a direction toward a headend is known as noise funneling or the funneling effect. The constant noise floor power level defines a noise level which a data carrier power level should exceed.

Ingress is unwanted intended external signals entering the cable plant at weak points in the cable such as shield discontinuities, improper grounding and bonding of cable sheaths, and faulty connectors. At these weak points, radio frequency carriers caused by broadcasts in, for example, the local AM band, citizen's band, ham operator band, or local or international shortwave band, may enter the cable. Consequently, interference noise peaks at particular carrier frequencies may be seen in noise spectral density measurements taken on cable distribution plants susceptible to ingress. To illustrate, consider FIG. 1, which shows a prior art distribution plant. Line amplifiers 5 along distribution cable 3 amplify the bi-directional signals as they propagate. Now consider cable section 6 where the shielding of the cable has become damaged or worn. A radio source 7, such as a ham radio operator or AM radio broadcaster in the 5–30 MHz range, is shown. Radio waves 8 emanating from source 7 enter the distribution cable at weak point 6 and interfere with the reverse transmission. The 5–30 MHz band is particularly noisy because of the various radio sources (e.g., AM radio broadcasts and ham radio) that are present in that band.

Common mode distortion is the result of non-linearities in the cable plant caused by connector corrosion creating point contact diodes. The effect of these diodes in the return plant is that difference products of driving signals consistently appear as noise power peaks at multiples of 6 MHz, i.e., 6, 12, 18, 24 and 30 MHz in the band of interest.

Impulse noise is defined as noise consisting of impulses of high power level and short duration. Corona and gap impulse noise are created by power line discharge. Temperature and humidity are especially influential in determining the degree of corona noise, while gap noise is a direct result of a power system fault, for example, a bad or cracked insulator. The resultant impulse noise spectrum can extend into the tens of megahertz with a sin x/x distribution.

Amplifier nonlinearities or oscillations relate to pulse regenerative oscillations caused by marginally stable or improperly terminated amplifiers. The result is a comb of frequency pecks within the return plant band whose spacing is related to the distance between the mistermination and the amplifier.

In U.S. Pat. No. 4,586,078, Citta et al. conclude that a 45 kilobit data signal may be alternatively transmitted by a coherent phase shift keying (CPSK) technique over carriers at 5.5 MHz and 11.0 MHz or in the vicinity of the T7 and T8 cable television channels respectively. A switch at the subscriber terminal alternately selects the 5.5 MHz carrier or the harmonically related 11 MHz carrier for transmission. This form of alternating carrier transmission of messages is continued until the data is successfully received. In other words, alternating transmission on the two carriers occurs until an acknowledgement signal indicating successful receipt of a message is received at a terminal. While the choice of these carrier frequencies is claimed to avoid the noise distribution peaks caused by interference noise, there is considerable concern that such a modulated phase shift keyed data stream will run into noise peaks in cable television distribution networks outside of the investigations of Citta et al.

Still other return path or upstream data transmission schemes have been tried. These schemes include, for example, the telephone system. In other words, the return data path to a cable television headend is not provided over the cable television distribution plant at all. The serving cable is intentionally avoided either because of the interference noise problem in a split system or because the system is a one way downstream system. Instead, the subscriber's telephone line is used for data transmission. An example of such a transmission system is shown in U.S. Pat. No. 5,012,510 to Schaubs. In this instance, however, there is concern that local telephone data tariffs may require the payment of the line conditioning surcharges if the telephone line to a subscriber's home is used for data transmission in addition to normal telephone service. Furthermore, the telephone line is only available when the subscriber is not using it, requiring an unscheduled or periodic data flow.

Consequently, the requirement remains in the cable television art for an upstream data transmission scheme providing data transmission from a plurality of subscriber premises to a cable television headend utilizing the cable television distribution plant and which is relatively impervious to interference noise.

The concept of Impulse Pay Per View (IPPV) is well understood in the art, but is described briefly here for completeness. Essentially it is a sales method by which a pay (cable) television subscriber may purchase specific program events on an individual basis. Furthermore, the purchase may be contracted on an "impulse" basis solely by interacting with the subscriber's terminal. Although it is not a requirement that the event being purchased be "in progress", it is a requirement that the system support the purchase of events that are in progress. The purchase must be handled in a manner that does not incur any appreciable delay in the subscriber's ability to view the event immediately.

Although several techniques of implementing the above sales method exist, all techniques have common requirements. Some part of the system must make a decision whether or not to allow the purchase and subsequent viewing of the event. If allowed, the purchase of the specific event must be recorded and reported to what is typically known as the "billing system" so that the program vendor eventually receives revenue from the transaction.

To accomplish purchased event reporting, a so-called "store and forward" technique is used. In the store and forward method, the subscriber terminal assumes that if the subscriber is pre-enabled for IPPV capability, then an event purchase is allowed. When the subscriber performs the necessary steps to purchase an event, the subscriber terminal allows the event to be viewed (typically by de-scrambling a video signal on a particular channel) and records the purchase of the event. The record is typically stored in a secure, nonvolatile memory, as it represents revenue to the program vendor.

Obviously, in order to realize the revenue, the vendor's billing system must obtain the purchase record data stored in all of the subscriber terminals in a timely manner. To accomplish this, the system control computer (hereinafter called the system manager) periodically requests that the subscriber terminals transmit the IPPV purchase data stored in memory. When like system manager receives the data from a subscriber terminal, it typically then acknowledges the receipt to the terminal and the data is cleared from memory to make room for additional purchase data. The system manager then forwards this data to the billing system, and the IPPV purchase cycle is completed.

While IPPV return data considerations are important to the determination of an RF data return technique, such IPPV return data considerations are not the only considerations. Other requirements such as for using the return data path for active device status monitoring, subscriber polling, burglar alarm, meter reading, home shopping, energy management, telephony and the like are additional to the data requirements of IPPV service.

In distribution systems employing separate forward and reverse data bands, it is necessary to use line amplifiers along the transmission path as shown in FIG. 1. It has been proposed to employ filters in these line amplifiers to separate the forward data transmission and reverse data transmission for separate amplification. These proposed filters, however, have used all lumped components, such as various types of capacitors, air wound inductors and toroidal inductors. Such lumped components are suitable for the low frequencies used for the 5–30 MHz reverse transmission band. The filters may include Chebychev, Cauer, Butterworth, Image Parameter or other types of filters as are known in the art. An example of such a device may be found in PCT Publication No. WO 93/22851 to Scientific-Atlanta, Inc.

SUMMARY OF THE INVENTION

As two-way information flow technology develops to encompass many additional services, such as alarm services, meter reading etc., more than 25 MHz bandwidth for the return data will be required. As a further example, telephony services will likely soon be available on cable television systems. Such additional data will not fit in the 5–30 MHz bandwidth currently in use. Note further that it is inadvisable to attempt to expand the upper range of the reverse frequency band above 30 MHz. Such expansion would come at the expense of a reduction in the space for actual television programs, presently carried in the 54–550 MHz range. The invention is directed to providing the needed additional bandwidth for these additional services.

The present invention relates to bi-directionally transmitting data along a transmission path in a cable television system. The present invention is also particularly directed to addressing the problem of ingress noise from external sources, such as AM band broadcasts, ham radio broadcasts, etc., interfering with the RF data return transmissions. In summary, Applicants employ a high frequency reverse band and a lower frequency forward band.

Applicants have found that, by using a return transmission in the 900–1000 MHz range, ingress noise is reduced and is not as significant a problem as it is in the 5–30 MHz band. Moreover, by using the 900–1000 MHz band, a full 100 MHz of bandwidth is provided to carry return data, which will allow significantly more return data transmission than in prior systems, even providing for such advanced applications as telephony and other interactive services. In a preferred embodiment, forward data is transmitted on the band of 46–735 MHz. The region from 735 MHz to 900 MHz provides an isolation region between the forward and reverse paths.

In accordance with the invention, a plurality of line amplifiers are placed on the data transmission path. Each line amplifier includes two diplex filters and two amplifiers. The first diplex filter includes a terminal that allows forward data signal input and provides reverse data signal output. The filter separates the high passband (900–1000 MHz) and low passband (46–735 MHz). The filter receives the reverse data signal from a 900–1000 MHz reverse amplifier and provides the forward data signal to a 46–735 MHz forward amplifier. The second diplex filter is identical to the first except it provides a terminal for receiving a reverse data signal and providing a forward data signal output. The second diplex filter also separates the high and low pass bands. The filter provides the reverse data signal to the 900–1000 MHz reverse amplifier and receives the forward data signal from the 46–735 MHz forward amplifier and provides the forward data signal at its terminal. Thus, the line amplifier serves to isolate, then amplify, the forward and reverse path transmissions.

The diplex filters themselves are formed from both lumped and distributed components such as surface mounted capacitors and inductors, air wound inductors and microstrip inductors. By using both lumped and distributed components, the various components can be uniquely selected for operation over the 46–1000 MHz frequency range. Moreover, by avoiding lumped inductors, a high degree of predictability is achieved and factory tuning is alleviated. By choosing the components individually, filters can be provided that allow performance comparable to filters used for a low-band (5–30 MHz) reverse channel including high isolation. The design of the filters takes into consideration and combats problems associated with the 900–1000 MHz band, which are not encountered in the 5–30 MHz band. Through component choices and implementation of this circuit on the same board as the amplifiers, the filter combats the challenges of implementing small inductor values, maintaining high Q for transition band sharpness and designing to avoid parasitic self-resonances. Moreover, the selected frequency band for reverse transmission provides an isolation band between the reverse path and forward path while providing a highly generous bandwidth for forward (downstream) services.

BRIEF DESCRIPTION OF THE DRAWINGS

FIG. 1 shows a prior art distribution plant;

FIG. 2 shows a simplified block diagram of a cable television system;

DETAILED DESCRIPTION OF THE PREFERRED EMBODIMENTS

Figure 3:
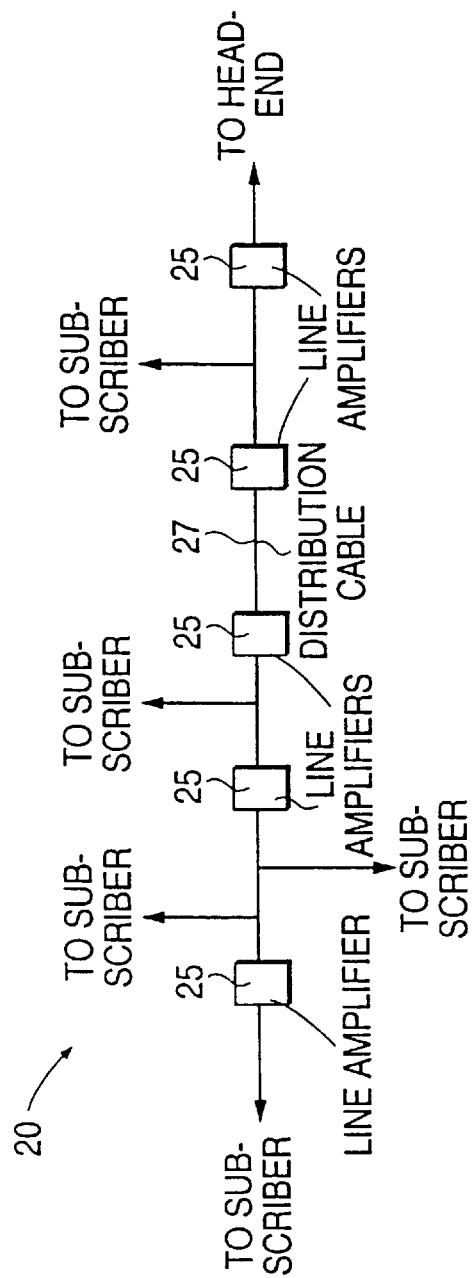
FIG. 3 shows a distribution network in accordance with the present invention.

FIG. 2 is a simplified block diagram for a cable television system in accordance with the invention. The cable headend 30 communicates with subscriber terminal 10 through distribution plant 20. The distribution plant will often include optical fibers, fiber transmitters and receivers, coaxial cable, amplifiers and the like. Of course, in a typical system, there would be hundreds or thousands of subscriber terminals 10 connected to headend 30 by distribution plant 20. Headend 30 transmits television signals and/or data signals to receiver (10b) of the subscriber terminal 10. While described in the cable television environment, it should be understood that the invention has applicablility to data transmission systems that do not include television signals. For example, the headend could provide access to computer networks. Subscriber terminal 10 may also include a transmitter (10a) to transmit data signals to headend 30. By "data" or "data signals" throughout this application, applicants refer to digital or analog data signals, including video, voice or other audio, or any other data representing information. In a preferred embodiment, the data transmitted by the subscriber is transmitted using quadrature phase shift keying modulation, but other types of modulation can be used and fall within the scope of the invention. The data signals transmitted from headend 30 to subscriber terminal 10 may include television programs as well as authorization information to authorize the subscriber to view certain programs, program information such as an electronic programming guide, or other information.

The data signals transmitted from subscriber terminal 10 to headend 30 may include billing data for pay-per-view or impulse-pay-per-view programs, subscriber polling or voting information, alarm system information, telephony, etc.

FIG. 3 shows a distribution network 20 in accordance with the present invention. A distribution cable 27 connects a headend to a plurality of subscribers. Line amplifiers 25 are placed at predetermined intervals along distribution cable 27. The line amplifiers serve to amplify the bi-directional signals to compensate for losses inherent in the transmission along distribution cable 27, whose loss at radio frequency increases in proportion to its length. Further, the amount of loss is dependent on transmitted frequency. The higher the frequency, the greater the loss over a given distance. As an example, consider an amplifier in this environment that raises the signal level by 30 db. Assume further that when propagating along distribution cable 27, the signal suffers a 30 db loss every mile. Then, to maintain signal strength, line amplifiers 25 would need to be placed at one mile intervals in order to maintain the signal above the level of undesirable noise.

Figure 4:
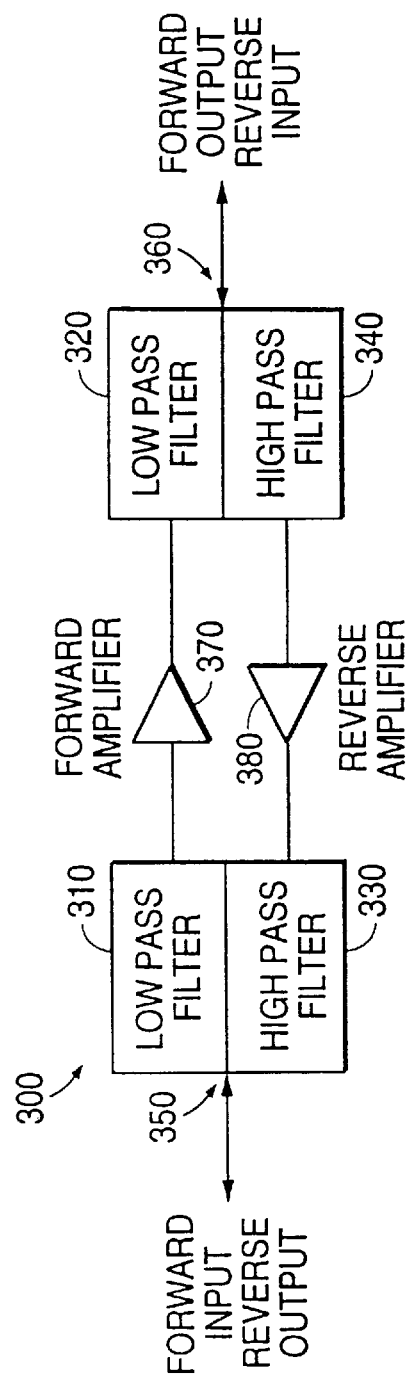
FIG. 4 shows a simplified block diagram of a line amplifier in accordance with the present invention.

FIG. 4 is a simplified block diagram of a line amplifier 300 in accordance with the invention. The characteristic impedance of both the distribution cable and the line amplifier is 75 ohms. In FIG. 4, two diplex filters 350,360 are shown. Each diplex filter 350,360 is shown as comprising a low pass filter 310,320 and a high pass filter 330,340. Connected between low pass filters 310,320 is a forward amplifier 370 for the 46–735 MHz forward signal. Coupled between high pass filters 330,340 is a reverse amplifier 380 for the 900–1000 MHz reverse signal.

The forward amplifier 370 may be a standard signal amplifier for the 46–735 MHz band. An example of such an amplifier is the Scientific Atlanta System Amplifier II, which is available in an 735 MHz model suitable for use with the instant invention. The reverse amplifier 380 may be of ultra-high frequency or microwave frequency design for operation in the 900–1000 MHz range. An example of such an amplifier is the Scientific Atlanta System Amplifier II, Reverse Module. The reverse module is available for the 900–1000 MHz range.

In operation, the forward input signal is received at diplex filter 350. It passes through low pass filter 310, is amplified by forward amplifier 370, then passes through low pass filter 320 and proceeds along the distribution line to the subscribers. High pass filters 330,340 serve to prevent forward signals from reaching the reverse path.

Similarly, the reverse input signal is received at diplex filter 360. The reverse signal passes through high pass filter 340, is amplified by reverse amplifier 380 and finally passes through high pass filter 330 to continue along the distribution line to the headend. Low pass filters 310,320 serve to prevent reverse signals from reaching the forward path.

Figure 5:
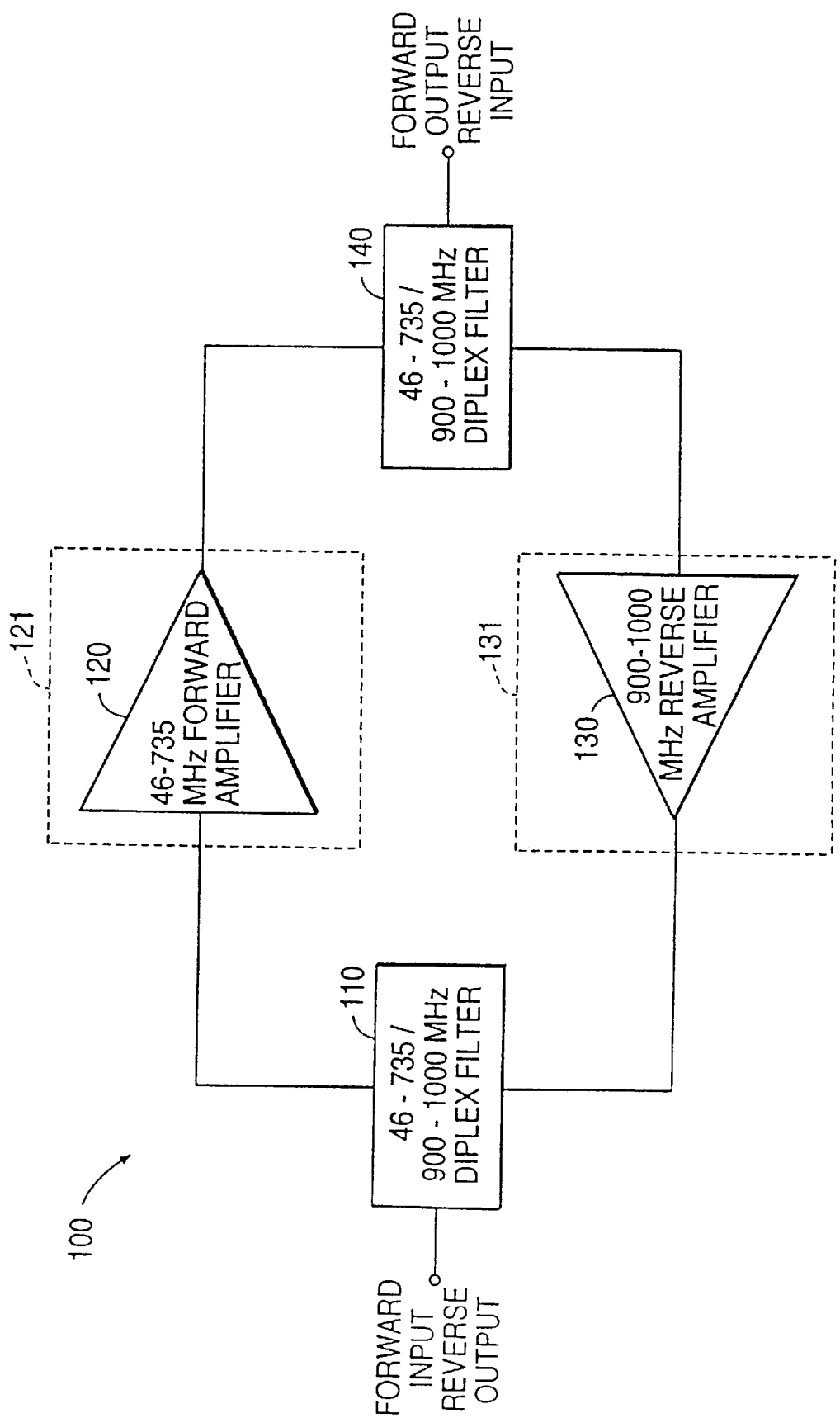
FIG. 5 shows a block diagram of a preferred embodiment of a line amplifier in accordance with the present invention.

For simplicity, diplex filters 350,360 are shown in FIG. 4 as each composed of two separate filters. In actuality, in the preferred embodiment, the low pass filter and high pass filter (forming each of diplex filters 350,360) are incorporated into a single diplex filter circuit as illustrated in FIG. 5. As can be seen with reference to FIG. 5, the diplex filters 110,140 are tri-port circuits, whose operation will now be described in further detail below.

FIG. 5 is a block diagram of a preferred embodiment of a line amplifier 100 in accordance with the invention. A first diplex filter 110 provides a terminal that receives forward input from the headend and provides an amplified return data signal from the subscriber. The diplex filter splits high band and low band signals so that only the forward data signal passes to 46–735 MHz forward amplifier 120 for amplification.

A second diplex filter 140 receives a reverse data signal from a subscriber and provides an amplified forward data signal from the headend. The second diplex filter also splits the high band and low band signals so that only the reverse data signal passes to the 900–1000 MHz reverse amplifier 130.

Figure 6:
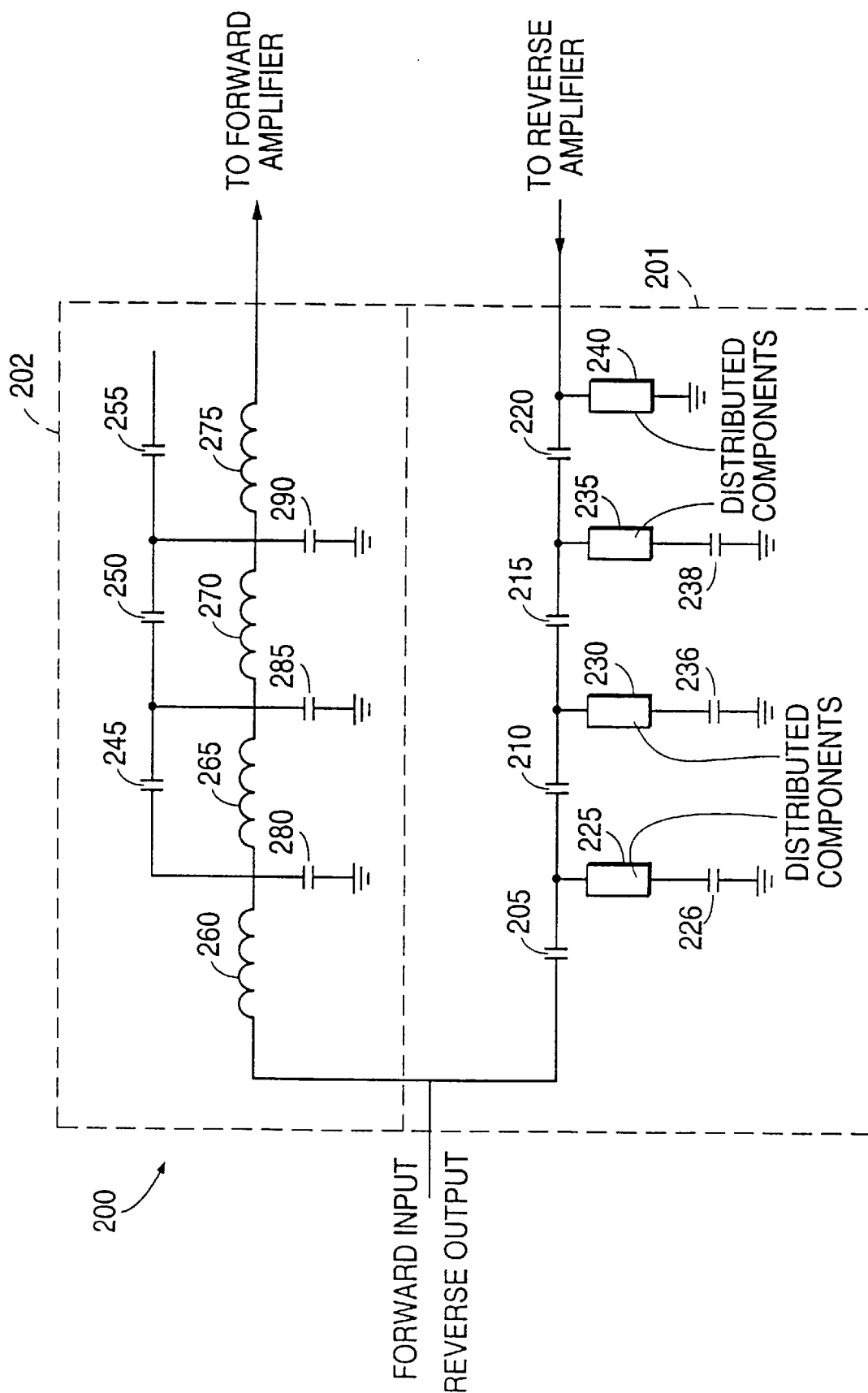
FIG. 6 shows the details of a diplex filter in accordance with the present invention.

The details of the diplex filters will now be described in regard to FIG. 6. FIG. 6 shows the structure of a diplex filter 200 corresponding to filter 110 in FIG. 5. Structurally, diplex filter 140 is identical to filter 110; only the inputs and outputs differ. Diplex filter 200 includes a high pass portion 201 and a low pass portion 202. The low pass portion 202 passes signals in the 46–735 MHz range. The high pass portion 201 passes signals in the 900–1000 MHz range.

As can be seen by reference to FIG. 6, a forward signal enters the filter at the left terminal. Low band components (46–735 MHz in the preferred embodiment) are passed to the forward amplifier by low pass portion 202. Similarly, high band components (900–1000 MHz in the preferred embodiment) are received from the reverse amplifier and passed to the reverse output by high pass portion 201.

Turning now to the details of the high pass portion 201, both lumped and distributed components are used in the high pass portion. The lumped components include capacitors 205, 210, 215, 220, 226, 236 and 238. In the preferred embodiment, high precision capacitors 205, 210, 215, 220 and 226 are 1.8 pF, 2.2 pF, 3 pF, 2.4 pF and 11 pF, respectively. Capacitors 236 and 238 are each variable capacitors in the range of 0.5–4.5 pF, which are trimmed to achieve optimal performance. By lumped components, applicants refer to components having the property of only essentially one of capacitance, inductance or resistance. Applicants realize that perfect lumped components do not exist. For example, all coil inductors have some extraneous resistive and capacitive properties. Therefore, by lumped components, applicants refer to components having minimal such extraneous properties. Examples of lumped component capacitors suitable for use in the filter are high precision capacitors sold by AVX Kyocera of Myrtle Beach, South Carolina under the tradename Accu F thin film series capacitors.

The distributed components include elements 225, 230, 235 and 240. Distributed components are components that have highly predictive resistive, capacitive and inductive properties distributed over their length. In a preferred embodiment, the distributed components are sections of copper trace printed on a dielectric printed circuit board. The characteristics of the filter are determined by three variables associated with the distributed components in the preferred embodiment: 1) the width of the copper trace, 2) the thickness of the dielectric printed circuit board, and 3) length of the trace. As an alternative, strips of copper tape could be used as distributed components.

For example only, applicants have found that good performance is achieved with the following dimensions: 1) dielectric board thickness equals 0.059 inches; 2) trace widths in each of elements 225, 230, 235 and 240 equal to 0.015 inches; and 3) trace lengths in elements 225, 230, 235 and 240 of 0.433 inches, 0.611 inches, 1.121 inches and 0.754 inches, respectively.

Low pass section 202 will now be described. With reference to FIG. 6, the low pass section is formed from solely lumped components. For example only, applicants have found that good performance is achieved with the following component values. Capacitors 245, 250, 255, 280, 285 and 290 at 0.5 pF, 3 pF, 3.3 pF, 3.3 pF, 2.2 pF and 1 pF, respectively. Air wound inductors 260 and 265 are formed by two turns of 22 gauge copper wire having a core diameter of 0.14 inches. Inductors 270 and 275 are also formed from 22 gauge copper wire but only one-half turn of wire (i.e., "U" shape) is used. It is preferable to place inductors 260 and 265 such that the coil axes are perpendicular to each other to reduce interaction between the two components.

In a preferred embodiment all the components of the diplex filter are on a single printed circuit board. In a more preferred embodiment, both diplex filters and the two amplifiers are placed on a single printed circuit board to form an integrated line amplifier. The integrated unit can then be easily and effectively heavily shielded to prevent signal leakage. Each amplifier may further include an additional high pass or low pass filter. These optional filters are shown in FIG. 5 as boxes 121,131 surrounding the amplifiers 120,130 to indicate that additional filters may be used as part of the amplifier circuitry. These additional filters, which may include microstrip inductors, are used to provide extra forward signal rejection in the reverse band or reverse signal rejection in the forward band.

The line amplifier may then preferably be placed in a weatherproof housing so that it may be suspended on an above-ground cable line or support pole or buried for an underground cable distribution system.

While FIG. 4–6 have been discussed only with regard to the RF domain, they are not so limited. For example, the line amplifier may be used in an optical fiber transmission system by providing interface circuitry at each end of the line amplifier.

The interface circuitry would include an optical receiver at each end of the line amplifier for receiving optical signals from the optical fiber and converting them into RF signals for use by the line amplifier. As an example of such an optical receiver, attention is directed to the copending application Ser. No. 753,951 to Little et al. and assigned to the same assignee as the instant invention, the disclosure of which is incorporated herein by reference.

The interface circuitry would also include laser circuitry to accept RF signals from the line amplifier and convert the signals to optical pulses for continued transmission along the optical fiber. Such circuitry is well known in the art.

Figure 7:
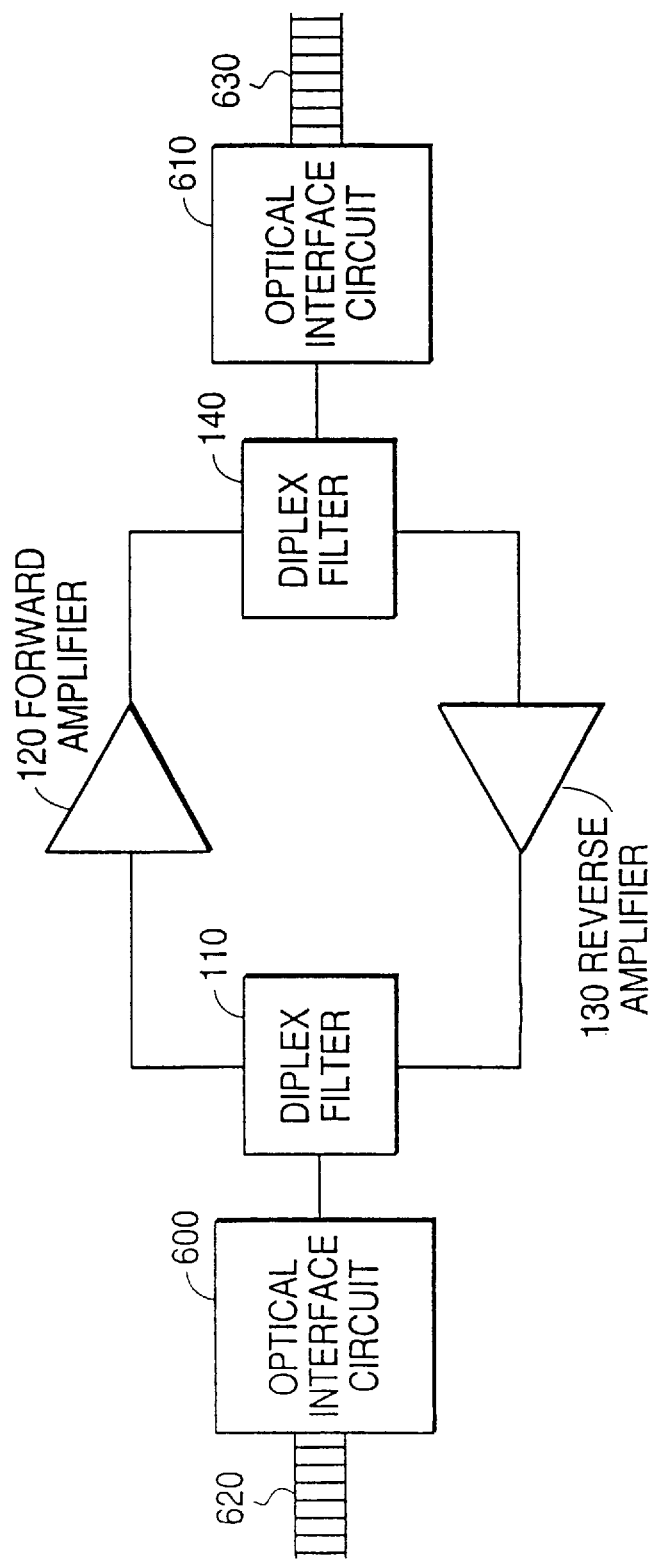
FIG. 7 shows a preferred embodiment of the present invention for use with an optical fiber distribution system.

FIG. 7 shows a preferred embodiment of the instant invention for use with an optical fiber distribution system. Elements 110, 120, 130 and 140 are the same as in FIG. 5 and no further explanation will be provided. In addition, optical interface units 600,610 are provided. Each interface unit 600,610 includes an optical receiver for receiving optical pulses from an optical fiber 620,630 and converting them to RP signals for use by the diplex filters 110,140 and amplifiers 120,130. Each interface unit 600,610 further includes laser circuitry for receiving an RF signal from diplex filters 110,140, respectively, and converting the signals to optical pulses for continued transmission along optical fibers 620,630.

In operation, a forward signal is transmitted as optical pulses along optical fiber 620. Optical interface unit 600 receives the optical pulses and converts them to an RF signal of 46–735 MHz in the preferred embodiment. The forward signal passes to forward amplifier 120 (through diplex filter 110) for amplification and then to optical interface circuit 610 (though diplex filter 140). In optical interface circuit 610, the RF signal is converted to optical pulses by laser circuitry within optical interface circuit 610. The optical pulses are then transmitted along optical fiber 630 toward the subscriber terminal.

Reverse signals are received from optical fiber 630 as optical pulses. Optical interface 610 converts the optical pulses to an RF signal in the 900–1000 MHz range. The RF signal is then passed to reverse amplifier 130 (through diplex filter 140) for amplification. After amplification, the RF signal is passed to optical interface unit 600 (through diplex filter 110), which converts the RF signal to optical pulses through the use of a laser circuit. The optical pulses are then transmitted toward the headend on optical fiber 620.

A third frequency band (e.g., 5–30 MHz) lower than either of the ones described above may also be used to transmit data. Such data may include reverse transmission television signals. For example, referring to FIG. 2, transmitters (10*a*) and (10*c*) may be located, for example, in a locations (10) and (11) remote from the headend (30) and connected to the distribution plant (20). These transmitters could then transmit upstream television signals. Accordingly upstream television signals could be transmitted on one upstream frequency band (e.g., 5–30 MHz) and other upstream data transmissions could be transmitted on another band (e.g., 900–1000 MHz). Of course, other configuration will be appreciated by those skilled in the art and fall within the scope of the invention, as limited only by the claims.

While the invention has been described in detail with reference to the drawings which show preferred embodiments, the invention is limited only by the claims. For instance, other frequency ranges can be used for both the forward and reverse transmissions, such choices limited only by having sufficient bandwidth to transmit the desired information and equipment to operate with that bandwidth. Similarly, all components listed by model number are for example only and the invention is not limited to those components.

Present day cable television systems frequently transmit forward transmissions in the 54–550 MHz band. Thus, the reverse band could be anywhere above the 550 MHz level. Of course, one skilled in the art would realize that an isolation band should be provided to prevent interference between the two signals. Assuming a practical isolation band of 50 MHz, then the reverse transmission could occur anywhere above 600 MHz.

What is claimed is:

1. A cable television system, comprising:
   a headend for transmitting signals having a plurality of octaves of bandwidth to at least one subscriber terminal across a distribution plant, said transmitted signals being transmitted within a first predetermined frequency band wherein said transmitted signals comprise a spectrum of frequencies, each said frequency being less than 1 Ghz; and
   a distribution plant including:
      a distribution cable; and
      a plurality of line amplifiers connected to said distribution plant, wherein each of said plurality of line amplifiers includes:
         two diplex filters each having a high pass portion and a low pass portion;
         a forward amplifier connected between said low pass portions of said diplex filters, wherein said forward amplifier further comprises a low pass filter having a microstrip inductor wherein said low pass filter passes said signals having a plurality of octaves of bandwidth and comprising a spectrum of frequencies with each frequency being less than 1 GHz; and
         a reverse amplifier connected between said high pass portions of said diplex filters, wherein said reverse amplifier further comprises a high pass filter; said distribution plant coupled to said headend and said at least one subscriber terminal wherein said subscriber terminal receives said signals from said headend and further transmits signals to said headend over said distribution plant.

2. A cable television system as recited in claim 1, further comprising a transmitter remote from said headend and connected to said distribution plant, said remote transmitter transmitting data to the headend within a third frequency band, said first and third frequency bands not overlapping and said third band containing lower frequencies than said first band.

3. A cable television system as recited in claim 2, wherein said remote transmitter transmits television signals to said headend over said third frequency band.

4. The cable television system as recited in claim 1 wherein said high pass portion of each of said diplex filters is composed of lumped and distributed components.

5. The cable television system as recited in claim 1 wherein said high pass filter of said reverse amplifier includes a microstrip inductor.

6. The cable television system as recited in claim 1 wherein said subscriber terminal transmitted signals are within a second predetermined frequency band.

7. The cable television system as recited in claim 6 wherein said first and second frequency bands do not overlap.

8. The cable television system as recited in claim 1 wherein said first frequency band is greater than 600 MHZ and said first band contains lower frequencies that said second band.

9. The cable television system as recited in claim 1 wherein said plurality of octaves is three.

10. The cable television system as recited in claim 1 wherein there is an isolation band less than 200 MHZ between the first band and the second band.

11. A line amplifier for a cable television system comprising:
   a first diplex filter having a low pass portion and a high pass portion;
   a second diplex filter having a low pass portion and a high pass portion;
   a forward amplifier couple between the low pass portion of said first diplex filter and the low pass portion of said second diplex filter, wherein said forward amplifier further comprises a low pass filter having a microstrip inductor wherein said low pass filter passes signals having a plurality of octaves of bandwidth and comprising a spectrum of frequencies with each frequency being less than 1 Ghz; and a reverse amplifer coupled between the high pass portion of said first diplex filter and the high pass portion of said second diplex filer.

12. A diplex filter for filtering transmitted and received signals wherein said transmitted signals have a plurality of octaves of bandwidth and comprise a spectrum of frequencies with each frequency being less than 1 GHz comprising:

a low pass portion wherein said low pass portion in connected to a forward amplifier including a low pass filter having a microstrip inductor wherein said low pass filter passes said signals having a plurality of octaves of bandwidth and comprising a spectrum of frequencies with each frequency being less than 1 GHz; and a high pass portion, said high portion being formed form both lumped and distributed components.

13. A diplex filter as recited in claim 12, wherein said distributed components include printed circuit board copper traces having predetermined widths and lengths.

* * * * *